US012722819B2

(12) United States Patent
Nagler et al.

(10) Patent No.: US 12,722,819 B2
(45) Date of Patent: Sep. 1, 2026

(54) DEVICE AND METHOD FOR THE FORCE-CONTROLLED CLOSURE OF PHARMACEUTICAL CONTAINERS

(71) Applicant: Syntegon Technology GmbH, Waiblingen (DE)

(72) Inventors: Stefan Nagler, Unterschneidheim (DE); Ulrich Krauß, Ilshofen (DE); Markus Ilgenfritz, Feuchtwangen (DE); Erich Hillenmeyer, Ellwangen (DE)

(73) Assignee: Syntegon Technology GmbH, Waiblingen (DE)

( * ) Notice: Subject to any disclaimer, the term of this patent is extended or adjusted under 35 U.S.C. 154(b) by 146 days.

(21) Appl. No.: 18/547,404

(22) PCT Filed: Feb. 22, 2022

(86) PCT No.: PCT/EP2022/054445

§ 371 (c)(1),
(2) Date: Aug. 22, 2023

(87) PCT Pub. No.: WO2022/180056

PCT Pub. Date: Sep. 1, 2022

(65) Prior Publication Data

US 2024/0124172 A1 Apr. 18, 2024

(30) Foreign Application Priority Data

Feb. 23, 2021 (DE) ..................... 10 2021 104 302.6

(51) Int. Cl.

| | |
|---|---|
| ***B65B 7/28*** | (2006.01) |
| ***B65B 57/00*** | (2006.01) |
| ***B67B 1/00*** | (2006.01) |

(52) U.S. Cl.

CPC ............ *B65B 7/2842* (2013.01); *B65B 57/00* (2013.01); *B67B 1/005* (2013.01)

(58) Field of Classification Search

CPC ....... B65B 7/2842; B65B 57/00; B65B 1/005; B65B 7/2821; B65B 3/003; B65B 7/2807; B65B 7/161; B65B 31/027

See application file for complete search history.

(56) References Cited

U.S. PATENT DOCUMENTS

| | | | |
|---|---|---|---|
| 6,199,350 | B1 | 3/2001 | Brechel et al. |
| 10,781,003 | B2 | 9/2020 | Procyshyn et al. |
| 2011/0030320 | A1 | 2/2011 | Blumenstock et al. |

(Continued)

FOREIGN PATENT DOCUMENTS

| | | | |
|---|---|---|---|
| CN | 104602738 | A | 5/2015 |
| DE | 19716846 | | 11/1998 |
| DE | 102008001282 | | 10/2009 |

(Continued)

OTHER PUBLICATIONS

Gruene Helmut, Machine Translation of EP 1520809 A1, 2004 (Year: 2025).*

(Continued)

*Primary Examiner* — Veronica Martin
(74) *Attorney, Agent, or Firm* — Michael Best & Friedrich LLP

(57) ABSTRACT

The invention relates to a device (10) for closing pharmaceutical containers (12) by means of closures (14).

20 Claims, 2 Drawing Sheets

(56) References Cited

U.S. PATENT DOCUMENTS

| | | | | |
|---|---|---|---|---|
| 2015/0190578 | A1* | 7/2015 | Okihara | B65B 7/2821 53/111 R |
| 2022/0135260 | A1* | 5/2022 | Larsson | B65B 7/2842 53/432 |

FOREIGN PATENT DOCUMENTS

| | | | | |
|---|---|---|---|---|
| DE | 202017103606 | | 8/2018 | |
| EP | 1520809 | A1 * | 4/2005 | B65B 59/003 |
| EP | 2923996 | | 9/2015 | |
| EP | 2995333 | A1 | 3/2016 | |

OTHER PUBLICATIONS

International Search Report for Application No. PCT/EP2022/054445 dated Jun. 13, 2022 (English Translation, 2 pages).
German Office Action for Application No. 102021104302.6 dated Oct. 25, 2021 (9 pages).
Chinese Patent Office First Action for Application No. 202280016172 dated Apr. 9, 2025 (17 pages with English translation).

* cited by examiner

DEVICE AND METHOD FOR THE FORCE-CONTROLLED CLOSURE OF PHARMACEUTICAL CONTAINERS

BACKGROUND

The present invention relates to a device for closing pharmaceutical containers by means of closures. In addition, the invention relates to a method.

Devices and methods of the type described above are known from the prior art, for example from U.S. Pat. No. 10,781,003 B2. Such devices allow simultaneous pressing of several closure elements onto several pharmaceutical containers.

The known devices operate in a path-controlled manner. This means that the closure elements are always pressed, pushed or moved the same distance onto or into the pharmaceutical containers. Several closures or closure elements are arranged together on a plate and moved a certain distance in the direction of the pharmaceutical containers to be closed in order to close them. In such a path-controlled closing of several pharmaceutical containers with closures by means of a common plate, it is disadvantageous that glass breakage, damaged closures or improperly closed containers may occur due to manufacturing tolerances in the height of the pharmaceutical containers or the closures. Such failures can also be caused by manufacturing tolerances in the device or in nests/carriers of the containers. This means that reliable sealing of the containers cannot be adequately guaranteed.

SUMMARY

The invention is based on the task of providing an improved device or an improved method that ensures a reliably reproducible closing process.

The invention solves this task by means of a device for closing pharmaceutical containers by means of closures according to the disclosure. The closing process is not path-controlled, but force-controlled by simple design means.

The device has a first holding device. The first holding device lies in a first plane. The first holding device is designed to hold at least one pharmaceutical container. In particular, several containers can be accommodated. The containers can be received individually or in a nest (when processing nested containers) in the holding device. Accordingly, the holding device can also be designed to receive a nest or other type of carrier with containers. For this purpose, a corresponding receptacle can be provided in the first holding device, which can grasp the nest.

A second holding device is located in a second plane parallel to and spaced apart from the first plane. The second holding device is designed to receive at least one closure for closing an opening of the pharmaceutical container. In particular, a plurality of closures may be received. The closures can be received individually or in a nest (when processing nested closures) in the holding device. Accordingly, the holding device can also be designed to receive a nest or otherwise formed carrier with closures. For this purpose, a corresponding receptacle can be provided in the second holding device, which can grasp the nest.

The two holding devices can be aligned or are aligned with each other such that the closure and the opening of the container are aligned.

The device comprises at least one pressure unit with a pressure element, in particular a piston of pin-like design, a counter element and a drive device.

By means of the drive device, the counter element and the pressure unit can be moved relative to each other along a closure movement axis orthogonal to the planes.

When the pressure unit (with the pressure element connected to it) and the counter element move towards each other, the closure and the container are brought into contact with each other between the pressure element and the counter element. The closure and the container are subjected to force/pressure between the pressure element and the counter element as a result of the further movement/processing towards each other in such a way that the closure is pressed onto or into the container in the direction of the closure movement axis in order to close the opening of the container.

According to the invention, the pressure element is mounted so that it can move translationally to the pressure unit in the direction of the closure movement axis. The movable mounting is designed in such a way that it opposes a movement of the pressure element relative to the pressure unit. The movable mounting is designed in such a way that a maximum contact force on the container and the closure, in particular an adjustable one, is specified by it. In other words, a maximum contact pressure with which the container and closure are pressed onto/into each other can be preset.

The device according to the disclosure enables a force-controlled and path-independent closing process of pharmaceutical containers.

The movable mounting of the pressure element relative to the pressure unit determines the maximum contact pressure or the maximum contact force between the container and the closure. A closure is pressed onto or into the container. The contact pressure or the contact force for the closing process results when the closure comes into contact with the container. The closing process for a container takes place until the specified maximum contact pressure is reached (e.g. the closure can be pushed deeper and deeper into the container). If the maximum contact pressure (or maximum contact force) specified by the movable mounting is exceeded, the pressure element moves translationally in the direction opposite to the direction in which the closure and container are moved towards each other along the closure movement axis towards the pressure unit. Consequently, the contact pressure applied by the pressure element to the closure and the container is not increased further and the closing process is completed. During this "yielding" (movement towards or into the pressure unit), the pressure element can maintain the maximum contact pressure, i.e. the force on the closure and container, or it can also reduce or completely release the force. However, the force with which the closure and the container are pressed into/onto each other is not increased via the contact pressure.

The closing process of a container is therefore dependent on the specified maximum contact pressure or maximum contact force, which is specified by the movable mounting, and is not path-dependent. When the maximum contact pressure (this is typically specified so that it corresponds to the pressure required to reliably seal a container) is reached, the press-on/press-in process is terminated, and the pressure or force with which the container and closure are pressed onto each other is not increased any further. This termination criterion is independent of the distance the pressure element or pressure unit has already moved. After the maximum contact pressure has been reached, the pressure element virtually gives way in the direction of the pressure unit. With the device according to the invention, manufacturing tolerances of the containers can therefore be compensated. In addition, the contact force is not increased further even if, for example, the closure is incorrectly seated on the container and cannot be correctly pressed in or on.

The device can be designed with only one pressure element and one counter element, so that only one pharmaceutical container is sealed at a time. If several pharmaceutical containers are to be sealed, this can be done successively or simultaneously. An end distance between the pressure element and the counter element can, due to manufacturing tolerances, be different for a first container closure pair than for a second container closure pair.

The pharmaceutical container may be a vial (injection bottle), a syringe or a carpule.

Suitable closures are provided for the various pharmaceutical containers. The closures can be press-on caps (caps with integrated rubber stopper), rubber stoppers with aluminum crimp caps, vial stoppers, syringe stoppers or carpule stoppers.

By an alignment of the closure and the opening of the pharmaceutical container is meant an arrangement which is such that the closure can be fitted or inserted onto or into the container so that the opening can be closed. For alignment, it may be provided that a central longitudinal axis of the closure and the pharmaceutical container coincide.

The pressure unit can be stationary in the device and the counter element can be movable relative to the pressure unit. Alternatively, the counter element can be stationary in the device and the pressure unit can be movable. The pressure unit and the counter element can also be movable in the device.

The pressure unit and the counter element can be moved towards each other along the closure movement axis by means of the drive device. The drive device can move the pressure unit, the counter element or the pressure unit and the counter element or be designed and arranged for this purpose. A further drive device can also be provided, so that the pressure unit and counter element each comprise a drive device.

The pressure element can be designed in particular as a pin-like piston, but also as a circular-cylindrical pin, cuboid, circular-cylindrical disk or a plate (round or angular). Various shapes are conceivable, e.g. also a shape adapted to corresponding openings in nests, e.g. the pressure element can have a clover leaf shape.

The counter element can be designed as a pin-like piston, circular cylindrical pin, cuboid, circular cylindrical disk or a plate. Various shapes are conceivable, e.g. also a shape adapted to corresponding openings in nests, e.g. the counter element can have a clover leaf shape.

Several pressure elements and a common counter element, in particular a plate-like counter element, can be provided, which serves as a counter bearing.

In advantageous embodiments, one (or more) drive device may be a mechanical, pneumatic, hydraulic, or electric drive device.

The counter element can be arranged along the direction of gravity both below and above the container and closure. If the counter element is arranged above the container and closure (the pressure unit with the pressure element is accordingly arranged below), the counter element can, for example, act on the closure and thus press the closure onto the container. If the counter element is arranged below the container and closure (pressure unit with pressure elements above), the counter element can act on the container and thus press the closure onto the container by acting on the container.

The contact force used to seal pharmaceutical containers typically ranges from 20N to 100N per container and closure.

The pressure element can be coupled to the pressure unit via a mechanical, pneumatic, hydraulic or electric pressure limiting device. Combinations of the various types of pressure limiting devices are also possible. The pressure limiting device limits the compressive force that can be applied or a limit value can be specified via it.

In particular, the pressure limiting device can comprise a combination of mechanical and pneumatic components, e.g. a spring, in particular a compression or disc spring, can be combined with a pneumatic cylinder.

The first holding device and/or the second holding device can be designed to be movable relative to the pressure unit and/or the counter element in the direction of the closure movement axis.

In one example, the first holding device is stationary and the second holding device is movable. During the closing process, the second holding device is moved towards the first holding device in the direction of the closing movement axis, for example by a drivable counter element or a drivable pressure unit. A container arranged on the first holding device and a closure arranged on the second holding device are brought into contact with each other for pressing the closure onto or into the container. Other combinations are conceivable, e.g. the first holding device can also be movable in the direction of the closure movement axis relative to the second holding device. When the drivable pressure unit moves, the first holding device is also moved in the direction of the second holding device in order to bring the container and the closure into contact.

Embodiments of the invention, in particular with a drivable pressure unit, may be configured such that the pressure element penetrates through a passage in the first holding device to contact a container from a side opposite the opening of the container (from the side of the container bottom).

The device can be designed, for example, for closing containers with different extensions in the direction of the closing movement axis. Pressure elements with different extension or basic position in the direction of the closing movement axis can be provided.

In embodiments of the invention with a drivable counter element, it can be provided that the drivable counter element contacts a movable second holding device (with the closure) on a side facing away from the closure. In this regard, the second holding device may be moved by the drivable counter element in the direction of the closure movement axis relative to the first holding device in order to contact the closure with the container. In alternative embodiments, the drivable counter element may be provided on the side of the first holding device (in which the containers are received).

The device can comprise a controller for controlling the drive device and/or the further drive device. The controller is designed to control the drive device and/or the further drive device in such a way that closing the opening of the container with the closure is force-controlled. In particular, the controller is designed to abort the pressing-in/pressing-on process after a maximum contact force has been reached. However, it can be provided that the abort does not take place immediately when the maximum contact force is reached, but after a further movement of the pressure unit and the counter element towards each other following the reaching of the maximum contact force. For example, a certain distance can be specified, which is then further reduced after it has been reached. It can also be provided that a certain distance must be traversed with the maximum contact force reached before it is aborted. This can prevent faulty termination due to brief force peaks.

In particular, the device can comprise one or more force measuring devices. The force measuring device can detect the force acting on all container/closure pairs between the pressure unit and the counter element. If there are several force measuring devices, one force measuring device in particular can be provided for each pressure element, which is designed to detect the force on the respective container/closure pair.

The force measuring device(s) can be connected to the controller by means of signals.

The first holding device may have a plurality of receptacles for containers. Further, the second holding device may have a corresponding plurality of receptacles for closures. The pressure unit may include a corresponding plurality of pressure elements. The pressure elements may be coupled to the pressure unit via a corresponding plurality of pressure limiting devices. The pressure elements may be coupled to the pressure unit via a common pressure limiting device.

For example, they can all be held in position relative to the pressure unit via a common pneumatic pressure chamber. If the pneumatic pressure in the pressure chamber is exceeded when the closures are pressed on, the pressure elements yield. The contact pressure is thereby limited to the pneumatic pressure specified in the pressure chamber. Similarly, the pressure can be specified hydraulically or electrically or electromechanically. The individual pressure elements can also have individual pressure limiting devices with which their respective contact pressure can be individually preset.

The receptacles of the first holding device can be designed in such a way that the containers can be held firmly in the first holding device, with play or clamping. The first holding device can also be designed without individual receptacles, so that the containers can be held loosely against each other.

In one embodiment, the second holding device can be designed such that the closures are held firmly in a clamping manner or can be received in the second holding device with play and translationally displaceable along the closure movement axis.

The above-mentioned task is also solved by a method according to the disclosure. With regard to the achievable advantages and further developments of the method, reference is made to the explanations relating thereto for the device.

The method for closing pharmaceutical containers, in which in particular a device as described above can be used, comprises at least the following steps: Providing, aligning and pressing on or pressing in.

In the first step (providing), at least one pharmaceutical container and at least one closure for closing an opening of the container are provided. Such a provision can take place, for example, by means of a first holding device for receiving at least one pharmaceutical container and/or by means of a second holding device for receiving at least one closure for closing an opening of the pharmaceutical container, as described above.

Subsequently (alignment), the pharmaceutical container and the closure are aligned relative to each other so that the closure and the opening of the container are aligned with each other. In other words, the container and closure are to be aligned such that the closure fits onto or into the container. In particular, the pharmaceutical container and the closure may be aligned such that a central longitudinal axis of the closure and the pharmaceutical container coincide. This can be achieved, for example, by constructing holding devices that are aligned with one another or by driving a drive device of one or both holding devices.

Subsequently (pressing on or pressing in), the closure is pressed onto or into the container along a closure movement axis to close the opening.

During the closing process, the container and the closure are pressed onto each other in a force-controlled manner. During the closing process, contact pressure between the container and the closure is only applied up to a predefined value of maximum contact pressure. Damage due to excessive force is reliably prevented.

Multiple containers can be closed with closures simultaneously. In one embodiment, the containers can be received in a plurality of receptacles in the first holding device with play or clamping, and the closures can be received correspondingly in a plurality of receptacles in the second holding device, as described above.

The containers and the closures can be pressed together with pressure between a respective pressure element and a counter element.

The contact pressure or contact force can be the same for all containers and closures. The maximum contact pressure can be specified in particular by a pressure limiting device which couples a pressure element to a pressure unit.

A first end distance may occur between a first pressure element and a counter element associated therewith, between which a first container closure pair is disposed. A second end distance may be between a second pressure member and a second counter member associated therewith, between which a second container closure pair is disposed. The first end distance and the second end distance may differ.

The end distance defines the distance between a pressure element and an associated counter element at the time when the closing process of a container is completed (after the maximum contact pressure has been reached). The end distance between a pressure element and an associated counter element depends on the extension, in particular the height, of the container (or the closure) in the direction of the closure movement axis. This can differ for containers of the same type due to manufacturing tolerances. Due to the different extension of the containers of two container/closure pairs, the respective container and the corresponding closure may contact each other at a different distance between a pressure element and an associated counter element. The contact pressure required for closing is therefore set at a different end distance for two container-closure pairs with a different extension of the container in the direction of the closure movement axis.

The closure can be pressed on or pressed in by a drivable counter element. The counter element can be arranged on a first side of the container, e.g. on the side on which the opening of the container is arranged.

The drivable counter element can apply a closing force in the direction of the closure movement axis towards a second side of the container facing away from the first side.

In a further embodiment of the method, the pressing on or pressing in of the closure can be performed by a drivable pressure unit with the pressure element. The drivable pressure unit with the pressure element may be arranged on a first side of the container, for example on the side opposite the opening of the container. An immovable counter element may be arranged on a side of the container opposite the first side. The immovable counter element can apply the closure force as a counter force against the direction of movement of the drivable pressure unit with the pressure element.

The maximum contact pressure or the maximum contact force between the container and the closure can be limited by a pressure limiting device that couples a pressure unit to the pressure element. The maximum contact pressure or the maximum contact force between the container and the closure can be adjustable by the pressure limiting device, in particular for different containers and different container qualities.

In an advantageous embodiment of the method, simultaneous or individual adjustment of the maximum contact pressure can be performed by the pressure limiting device. The pressure limiting device can be designed to allow simultaneous adjustment of the maximum contact pressure, for example by coupling the pressure elements to the pressure unit with only one pressure limiting device, for a simple design implementation. Alternatively, the maximum contact pressure can be adjusted individually, for example by having each pressure element coupled to the pressure unit with a corresponding pressure limiting device. This contributes to a more precise closing process.

For further embodiment of the method, the aspects described in connection with the device or those still explained below may serve.

BRIEF DESCRIPTION OF THE DRAWINGS

The invention is explained below with reference to the figures, whereby identical or functionally identical elements are provided with identical reference signs, but where applicable only once. It shows.

DETAILED DESCRIPTION

Figure 1:
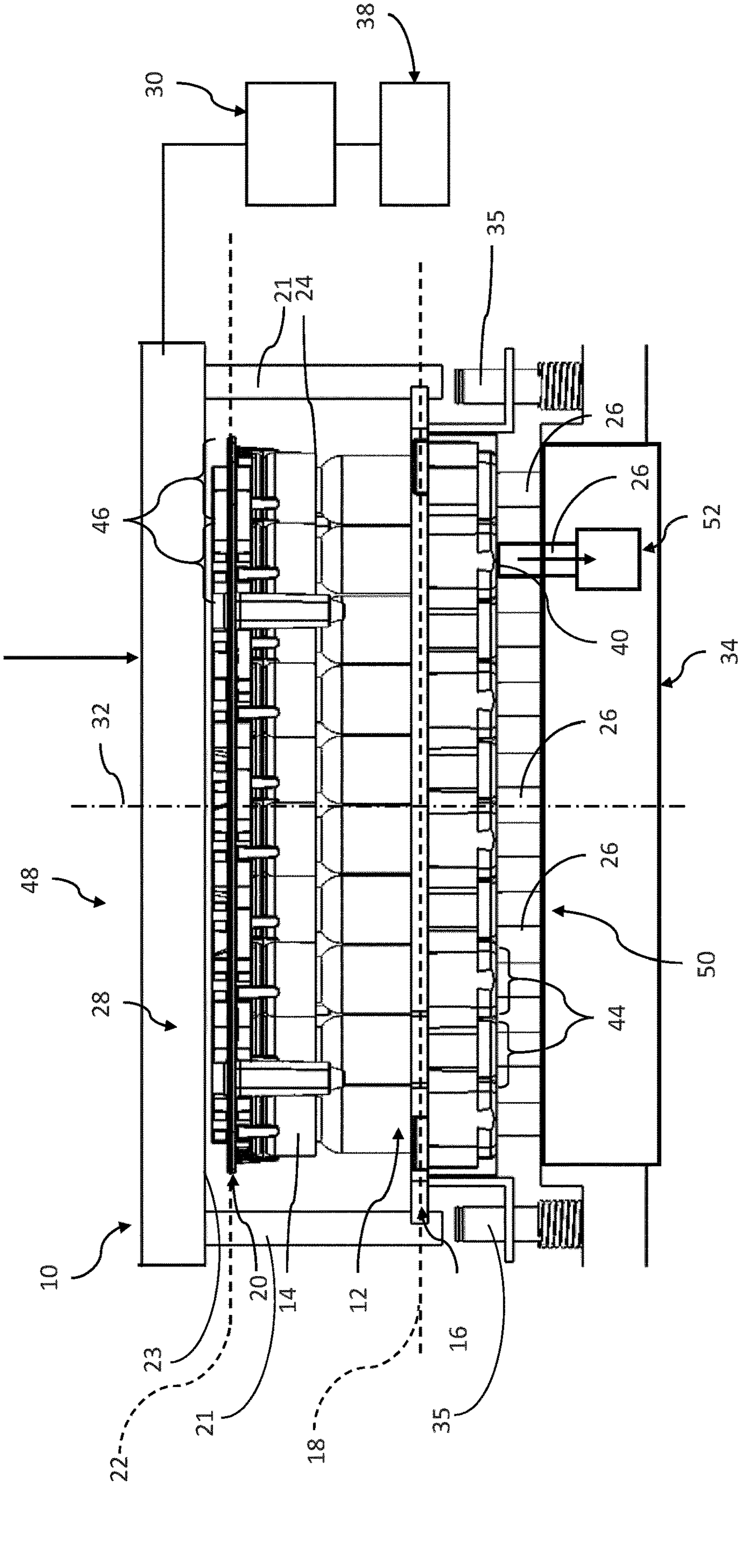
FIG. 1 a device for closing pharmaceutical containers by means of a drivable counter element in a schematic, partially cut side view.

FIG. 1 shows a device for closing pharmaceutical containers, the device as a whole being designated by the reference sign 10.

The device 10 has a first holding device 16 and a second holding device 20.

The first holding device 16 has a plurality of receptacles 44. The receptacles 44 are for receiving pharmaceutical containers 12. (The holding device 16 may also have a single receptacle for receiving a nest of containers.) Each pharmaceutical container 12 includes an opening 24. Each of the receptacles 44 has a passageway 40. The passage 40 is arranged opposite the opening 24 of each of the pharmaceutical containers 12.

The second holding device 20 includes a plurality of receptacles 46. The receptacles 46 are for receiving closures 14 for closing the opening 24 of the containers 12. (The holding device 20 may also have a single receptacle for receiving a nest of closures.)

The device 10 of FIG. 1 comprises a counter element 28 with a drive device 30. In the device 10 of FIG. 1, the counter element 28 is in the form of a plate.

In FIG. 1, the counter element 28 has two cylindrical first stops 21. The first stops 21 project vertically from an end face 23 of the counter element 28. The end face 23 of the counter element 28 is designed for contacting the second holding device 20. In each case, a first stop 21 is laterally adjacent to the holding device 20.

The device 10 has a controller 38 for controlling the drive device 30. The controller 38 is connected to the drive unit 30 by means of signals.

The device 10 has a pressure unit 34 with pressure elements 26. In FIG. 1, the pressure elements 26 are designed as pin-like pistons. The pressure elements 26 are coupled to the pressure unit 34 via a pressure limiting device 52. The pressure limiting device 52 adjustably specifies the contact force that can be applied by the pressure element 26.

A cylindrical second stop 35 is arranged on both sides of the pressure unit 34. The longitudinal axis of the second stops is parallel to the central longitudinal axis of the pressure elements. The stops extend in the same direction as the pressure elements 26. The second stops are spaced apart from each other by the same amount as the first stops on the counter element 28.

The first holding device 16 is arranged extending in a first plane 18. The second holding device 20 is arranged extending in a second plane 22. The second plane 22 is arranged parallel to and spaced from the first plane 18. The first and second holding devices 16, 20 are aligned with each other such that the closure 14 and the opening 24 of the container 12 are aligned with each other.

In this example, the counter element 28 is located on a side 48 of the containers 12 facing the opening 24, parallel to the plane 22 (arrangement of the counter element 28 along the direction of gravity above the containers 12 and the closures 14).

The pressure unit 34 with pressure elements 26 is arranged on a side 50 of the containers 12 opposite the opening 24 of the containers 12, parallel to the plane 18 (arrangement of the pressure unit 34 along the direction of gravity below the containers 12).

The first and second holding devices 16, 20 are formed separately from the counter element 28 and pressure unit 34 and are arranged between them accordingly. The first holding device 16 is spaced from the pressure unit 34.

The pressure elements 26 protrude out of the pressure unit 34 in the direction of the first holding device 16. The pressure elements 26 are arranged in the pressure unit 34 in such a way that the pressure elements 26 penetrate through the passages 40 and contact the containers 12 on a side opposite the opening 24 of the containers 12 (in other words, the containers 12 rest on the pressure elements 26). In this case, the pressure elements 26 are mounted so as to be movable translationally relative to the pressure unit 34 in the direction of a closure movement axis 32 orthogonal to the planes 18, 22. The movable mounting is designed in such a way that it can be used to preset, in particular adjust, a maximum contact pressure exerted between the containers 12 and the closures 14 during the closing process.

Furthermore, the first and second holding devices 16, 20 are movably mounted in the direction of the closure movement axis 32 relative to the pressure unit 34. The first holding device 16 is mounted via the second stops. Furthermore, the second holding device 20 is movably arranged in the direction of the closure movement axis 32 and relative to the first holding device 16.

The counter element 28 can be moved by the drive device 30 in the direction of the closure movement axis 32 relative to the pressure unit 34. The movement of the counter element 28 towards the pressure unit 34 corresponds to a closing movement direction.

When the counter element 28 is moved in the closing movement direction, the closures 14 are brought into contact with the containers 12 and pressed onto the containers 12.

A contact pressure acts between the containers 12 and closures 14 to press the closures 14 onto the containers 12. When the closures 14 are pressed onto the containers 12, the contact pressure increases. When the contact pressure between the individual containers 12 and the corresponding closures 14 reaches a maximum contact pressure predetermined by the mounting of the pressure elements 26, the pressure elements 26 move along the closure movement axis 32. They yield, as it were, and thus limit the maximum contact force acting on the containers.

Due to manufacturing tolerances, the containers 12 can have different extensions in the direction of the closure movement axis 32. The closures 14 and containers 12 therefore do not all reach the maximum contact pressure at the same travel distance of the pressure elements 26 or at the same time.

The containers 12 are each positioned on a pressure element 26. Via the pressure limiting device 52, the maximum contact pressure is set to the same value for each of the pressure elements 26. In other words, the mounting of the pressure elements 26 yields in each case when the same pressure or force is reached.

When the contact pressure between a closure 14 and a container 12 reaches the maximum contact pressure, the corresponding pressure element 26 yields and moves into the pressure unit 34 as the pressure unit 34 and the counter element 28 continue to move toward each other, maintaining the maximum contact pressure.

An end distance between pressure element 26 and counter element 28 of a first container closure pair 12, 14 may be different than that of a second container closure pair 12, 14 if the maximum contact pressure is achieved at different travel distances for the two pairs.

The first stops arranged on the counter element 28 and the second corresponding stops arranged next to the pressure unit 34 are designed to contact each other and to limit the maximum travel distance of the counter element 28 relative to the pressure unit 34 during the closing movement.

Figure 2:
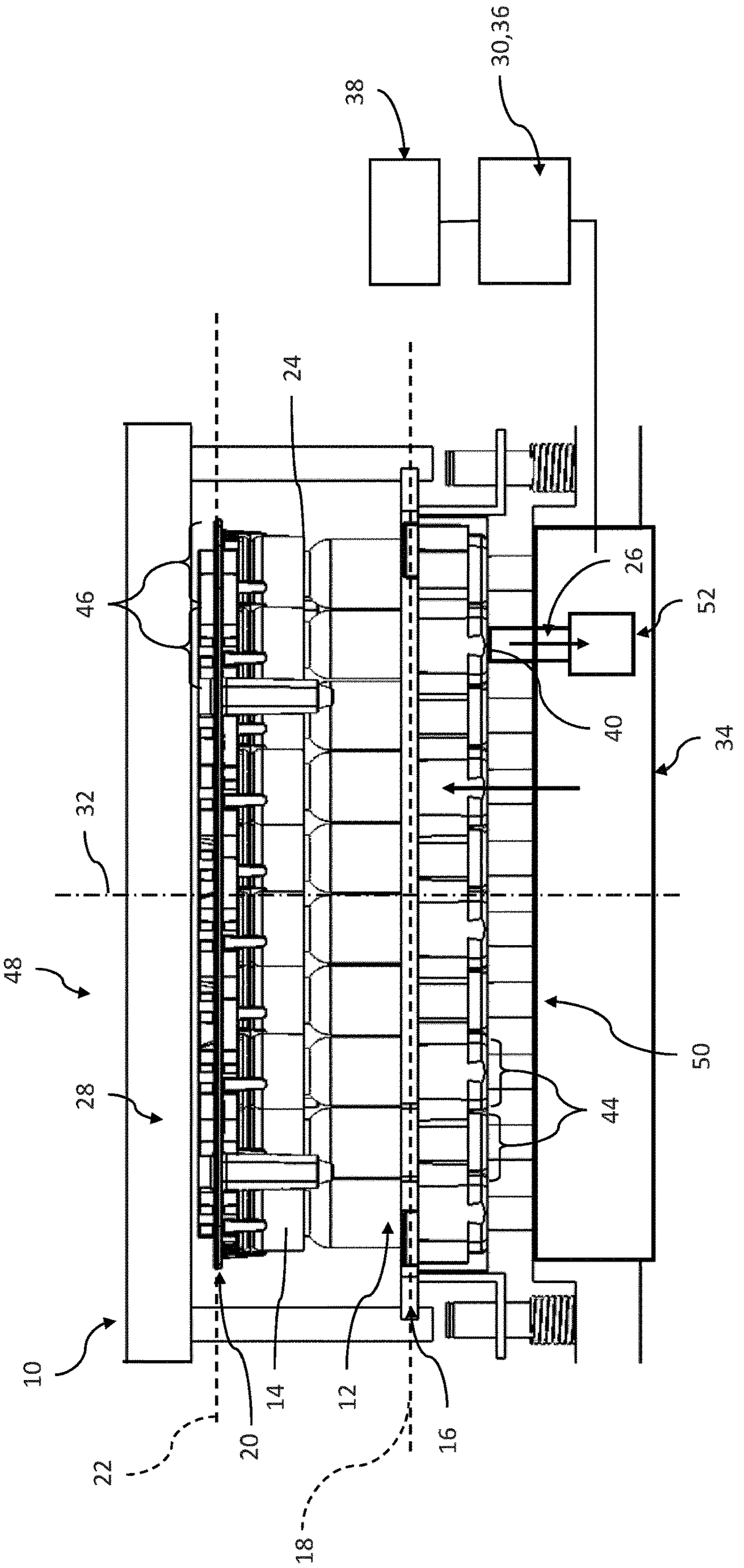
FIG. 2 a device for closing pharmaceutical containers by means of a drivable pressure unit in a schematic, partially cut side view.

FIG. 2 shows an alternative embodiment of the device 10 shown in FIG. 1.

In contrast to the device 10 shown in FIG. 1, the counter element 28 is of fixed design. The pressure unit 34 can be moved along the closure movement axis 32 relative to the counter element 28 by means of a drive device 30.

The movement of the pressure unit 34 towards the counter element 28 corresponds to the closing movement direction in the device 10 of FIG. 2.

When the pressure unit 34 is moved along the closure movement axis 32 onto the counter element 28, the pressure elements 26 penetrate through the passages 40 and press the containers 12 out of the holding device 16 in the direction of the closure movement axis 32. In the process, the containers 12 contact the closures 14 and the containers 12 are pressed into the closures 14 (or the closures 14 are pressed onto the containers 12). The pressing-in is continued until a predetermined maximum contact pressure or a contact force, which can be set via the pressure limiting device 52 for the mounting of the pressure elements 26, is exceeded and the pressure elements 26 virtually no longer move further, but move into the pressure unit 34 when the latter is moved further towards the counter element 28.

According to the device 10 of FIG. 1, manufacturing tolerances in the extension in the closing movement axis 32 of the containers 12 can be compensated, due to which each container 12 to be closed is assigned to a pressure element 26.

What is claimed is:

1. A device (10) for closing pharmaceutical containers (12) via closures (14), the device comprising:

a first holding device (16), which lies in a first plane (18), for receiving at least one pharmaceutical container (12), a second holding device (20), which lies in a second plane (22) parallel to and spaced apart from the first plane (18), for receiving at least one closure (14) of the closures (14) for closing an opening (24) of the at least one pharmaceutical container (12), wherein the first and the second holding devices (16, 20) are alignable or aligned with each other such that the at least one closure (14) and the opening (24) of the at least one pharmaceutical container (12) are aligned with each other, the device (10) further comprising at least one pressure unit (34) with a pressure element (26) and a counter element (28), wherein the device (10) comprises a drive device (30), by which the counter element (28) and the at least one pressure unit (34) can be moved relative to one another along a closure movement axis (32) orthogonal to the first and second planes (18, 22), wherein during a closure movement the at least one pressure unit (34) and the counter element (28) both move towards one another, the at least one closure (14) and the at least one pharmaceutical container (12) are brought into contact between a pressure element (26) and the counter element (28) and are pressurized between the pressure element (26) and the counter element (28) in such a way that the at least one closure (14) is pressed onto or into the at least one pharmaceutical container (12) with a contact force in a direction of the closure movement axis (32) in order to close the opening (24) of the at least one pharmaceutical container (12), wherein the pressure element (26) is mounted to be translationally movable relative to the at least one pressure unit (34) in the direction of the closure movement axis (32), and a movable mounting of the pressure element (26) is configured in such a way that a maximum contact force exerted on the at least one pharmaceutical container (12) and the at least one closure (14) during the closure movement is predetermined, wherein the movable mounting of the pressure element (26) is designed in such a way that the maximum contact force on the at least one pharmaceutical container and the at least one closure is specified by the movable mounting of the pressure element (26), such that when the at least one closure is pressed onto or into the at least one pharmaceutical container, the contact force or the contact force for a closing process results when the at least one closure comes into contact with the at least one pharmaceutical container and the closing process for the at least one pharmaceutical container continues until the maximum contact force is reached and that when the maximum contact force specified by the movable mounting is exceeded, the pressure element moves translationally in a direction opposite to a direction in which the at least one closure and the at least one pharmaceutical container are moved towards each other along the closure movement axis towards the at least one pressure unit, such that the contact force applied by the pressure element to the at least one closure and the at least one pharmaceutical container is not increased further and the closing process is completed, such that during this movement towards or into the at least one pressure unit, the pressure element can maintain the maximum contact force or the pressure element can reduce or completely release the contact force but not increase the contact force over the maximum contact force, such that the closing process of the at least one pharmaceutical container is dependent on the maximum contact force, which is specified by the movable mounting, and is not path-dependent and when the maximum contact force is reached, a press-on/press-in process is terminated, and a pressure or force with which the at least one pharmaceutical container and the at least one closure are pressed onto each other is not increased any further, wherein this termination criterion is independent of a distance the pressure element or the at least one pressure unit has already moved and wherein after the maximum contact force has been reached, the pressure element gives way in a direction of the at least one pressure unit.

2. The device (10) according to claim 1, wherein the pressure element (26) is coupled to the at least one pressure unit (34) via a mechanical, pneumatic, hydraulic or electric pressure limiting device (52) that limits the contact force that can be applied by the pressure element (26).

3. The device (10) according to claim 1, wherein the first holding device (16) and/or the second holding device (20) is configured to be movable relative to the at least one pressure unit (34).

4. The device (10) according to claim 1, wherein the counter element (28) in the device (10) can be moved translationally along the closure movement axis (32) relative to the at least one pressure unit (34) by the drive device (30), or wherein the counter element (28) is arranged immovably in the device (10).

5. The device (10) according to claim 1, wherein the at least one pressure unit (34) in the device (10) can be moved translationally along the closure movement axis (32) relative to the counter element (28) by the drive device (30) or a further drive device (36), or wherein the at least one pressure unit (34) is arranged immovably in the device (10).

6. The device (10) according to claim 5, wherein a controller (38) is provided for controlling the drive device (30) and/or the further drive device (36), the controller (38) being designed to control the drive device (30) and/or the further drive device (36) in such a way that closing of the opening (24) of the at least one pharmaceutical container (12) with the at least one closure (14) takes place in a force-controlled manner, the controller (38) being configured to interrupt a pressing-in/pressing-on operation of the movable mounting after the maximum contact force has been reached.

7. The device (10) according to claim 1, wherein the at least one pressure unit (34) with the pressure element (26) is arranged on a side of the first holding device (16), the pressure element (26) penetrating through a passage (40) formed on the first holding device (16) during a closing operation for contacting the at least one pharmaceutical container (12), in order to contact the at least one pharmaceutical container (12) at an end of the at least one pharmaceutical container (12) facing away from the opening (24), wherein the counter element (28) is arranged on a side of the second holding device (20), or wherein the at least one pressure unit (34) with the pressure element (26) is arranged on a side of the second holding device (20), wherein the pressure element (26) penetrates through a passage (42) formed on the second holding device (20) during a closing operation for contacting the at least one closure (14) in order to contact the at least one closure (14) on a side facing away from the opening (24), and the counter element (28) is arranged on a side of the first holding device (16).

8. The device (10) according to claim 1, wherein the first holding device (16) comprises a plurality of receptacles (44) for containers (12) of the at least one pharmaceutical container (12) and the second holding device (20) comprises a corresponding plurality of receptacles (46) for corresponding ones of the closures (14), and the at least one pressure unit (34) comprises a corresponding plurality of pressure elements (26) coupled to the at least one pressure unit (34) via a corresponding plurality of pressure limiting devices (52) or via a common pressure limiting device (52).

9. The device (10) according to claim 1, wherein a pressure limiting device (52) is configured to preset a same maximum contact force on the pharmaceutical containers (12) and the closures (14) in an adjustable manner, in each case or wherein the pressure limiting device (52) is designed to preset a maximum contact force on the pharmaceutical containers (12) and the closures (14) in each case in an individually adjustable manner.

10. The device (10) according to claim 1, wherein the pressure element (26) includes a piston of pin-like design.

11. The device (10) according to claim 1, wherein the maximum contact force exerted on the at least one pharmaceutical container (12) and the at least one closure (14) during a closure operation is predetermined in an adjustable manner.

12. The device (10) according to claim 6, wherein the controller (38) is configured to interrupt the pressing-in/pressing-on operation after the maximum contact force has been reached, and also after a further movement of the at least one pressure unit and the counter element towards one another following reaching of a maximum pressing-on force.

13. A method for closing pharmaceutical containers (12) via closures (14), the method comprising:

providing at least one pharmaceutical container (12) of the pharmaceutical containers (12) and at least one closure (14) of the closures (14) for closing an opening (24) of the at least one pharmaceutical container (12), aligning the at least one pharmaceutical container (12) and the at least one closure (14) relative to each other so that the at least one closure (14) and the opening (24) of the at least one pharmaceutical container (12) are aligned with each other, pressing the at least one closure (14) onto or into the at least one pharmaceutical container (12) along a closure movement axis (32) to close the opening (24), wherein the at least one pharmaceutical container (12) and the at least one closure (14) are pressed into or onto each other in a force-controlled manner, so that a contact force exerted on the at least one pharmaceutical container (12) and the at least one closure (14) is exerted only up to a predetermined value of a maximum contact force, wherein when the at least one closure is pressed onto or into the at least one pharmaceutical container, the contact force or the contact force for a closing process results when the at least one closure comes into contact with the at least one pharmaceutical container and the closing process for the at least one pharmaceutical container continues until the maximum contact force is reached, wherein the closing process of the at least one pharmaceutical container is dependent on the maximum contact force and is not path-dependent and when the maximum contact force is reached, a press-on/press-in process is terminated, and a pressure or force with which the at least one pharmaceutical container and the at least one closure are pressed onto each other is not increased any further.

14. The method according to claim 13, wherein the at least one pharmaceutical container (12) is a plurality of pharmaceutical containers (12) and the plurality of pharmaceutical containers (12) are simultaneously closed with corresponding closures (14) of the closures (14) by being pressed onto one another with a contact force between a respective pressure element (26) and a counter element (28), wherein the contact force is equal for all of the plurality of pharmaceutical containers (12) and the corresponding closures (14) and a first end distance between a first pressure element (26) and a counter element (28) associated therewith, between which a first container-closure pair (12, 14) is arranged, and a second end distance between a second pressure element (26) and a second counter element (28) associated therewith, between which a second container-closure pair (12, 14) is arranged, are different.

15. The method according to claim 13, wherein the pressing onto or pressing into of the at least one closure (14) is carried out by a drivable counter element (28) which is arranged on a first side (48) of the at least one pharmaceutical container (12), wherein the drivable counter element (28) applies the contact force in a direction of the closure movement axis (32) towards a second side (50) of the at least one pharmaceutical container facing away from the first side (48), and wherein the maximum contact force on the at least one pharmaceutical container (12) and the at least one closure (14) is limited by a pressure limiting device (52) which couples a pressure unit (34) to a pressure element (26).

16. The method according to claim 13, wherein the pressing onto or pressing into of the at least one closure (14) is carried out by a drivable pressure unit (34) with a pressure element (26), which is arranged on a first side (48) of the at least one pharmaceutical container (12), wherein a counter element (28), which is arranged on a second side (50) of the at least one pharmaceutical container opposite the first side (48), forms a counter bearing for the drivable pressure unit (34), so that the at least one pharmaceutical container and the at least one closure (14) are arranged between the drivable pressure unit (34) and the counter element (28), and wherein the maximum contact force on the at least one pharmaceutical container (12) and the at least one closure (14) is limited by a pressure limiting device (52) which couples the drivable pressure unit (34) to the pressure element (26).

17. The method according to claim 13, wherein the method comprises a step of adjusting the maximum contact force on the at least one pharmaceutical container (12) and the at least one closure (14).

18. The method according to claim 13, wherein method comprises a step in which for several pairs of a container (12) of the at least one pharmaceutical container (12) and respective closures (14) of the closures (14), the maximum contact force is adjusted to an identical value or to at least 2 different values.

19. The method according to claim 15, wherein the first side (48) of the at least one pharmaceutical container (12) is a side on which the opening (24) of the at least one pharmaceutical container (12) is arranged, and wherein the pressure unit (34) is immovable.

20. The method according to claim 16, wherein the first side (48) of the at least one pharmaceutical container (12) is a side opposite to the opening (24) of the at least one pharmaceutical container (12), and wherein the counter element (28) is immovable.

* * * * *